United States Patent
Beham

(10) Patent No.: US 6,798,879 B1
(45) Date of Patent: Sep. 28, 2004

(54) REMOTE TELEPHONE CALL NOTIFICATION SYSTEM

(76) Inventor: Thomas C. Beham, 188 Delaware Trail, Copley, OH (US) 44321

( * ) Notice: Subject to any disclaimer, the term of this patent is extended or adjusted under 35 U.S.C. 154(b) by 649 days.

(21) Appl. No.: 09/684,508

(22) Filed: Oct. 6, 2000

(51) Int. Cl.$^7$ .............................. H04M 1/00; H04M 3/00
(52) U.S. Cl. .................. 379/355.03; 379/193; 379/418; 455/41.2
(58) Field of Search .............................. 379/48, 374.02, 379/193, 355.03, 418; 455/41.2, 567

(56) References Cited

U.S. PATENT DOCUMENTS

| | | | |
|---|---|---|---|
| 3,819,860 A | * | 6/1974 | Miller ......................... 381/380 |
| 3,835,640 A | * | 9/1974 | Hughes, Jr. ................... 368/63 |
| 5,040,204 A | * | 8/1991 | Sasaki et al. ............. 455/552.1 |
| 5,404,391 A | * | 4/1995 | Wavroch et al. ............. 455/567 |
| 5,729,589 A | | 3/1998 | Samson |
| D394,412 S | | 5/1998 | Hanson |
| 5,848,362 A | | 12/1998 | Yamashita |
| 5,878,354 A | | 3/1999 | Hasegawa |
| 5,894,455 A | | 4/1999 | Sikes |

* cited by examiner

*Primary Examiner*—Curtis Kuntz
*Assistant Examiner*—Alexander Jamal

(57) ABSTRACT

A remote telephone call notification system for notifying a user at a remote location that a communication device is receiving a call. The remote telephone call notification system includes a base unit and a remote unit, with the base unit being adapted for interfacing with the communication device and the remote unit being adapted for being toted by a user. The base unit includes a transmitter for wirelessly transmitting to the remote unit, and detection circuitry for detecting reception by the communication device of an incoming ring signal. The detection circuitry causes the transmitter to transmit an activation signal upon the detection of the incoming ring signal. The remote unit comprises a receiver for receiving wireless transmissions of the activation signal from the transmitter of the base unit. The remote unit includes an audible sound device for generating an audible sound upon reception of the activation signal.

1 Claim, 2 Drawing Sheets

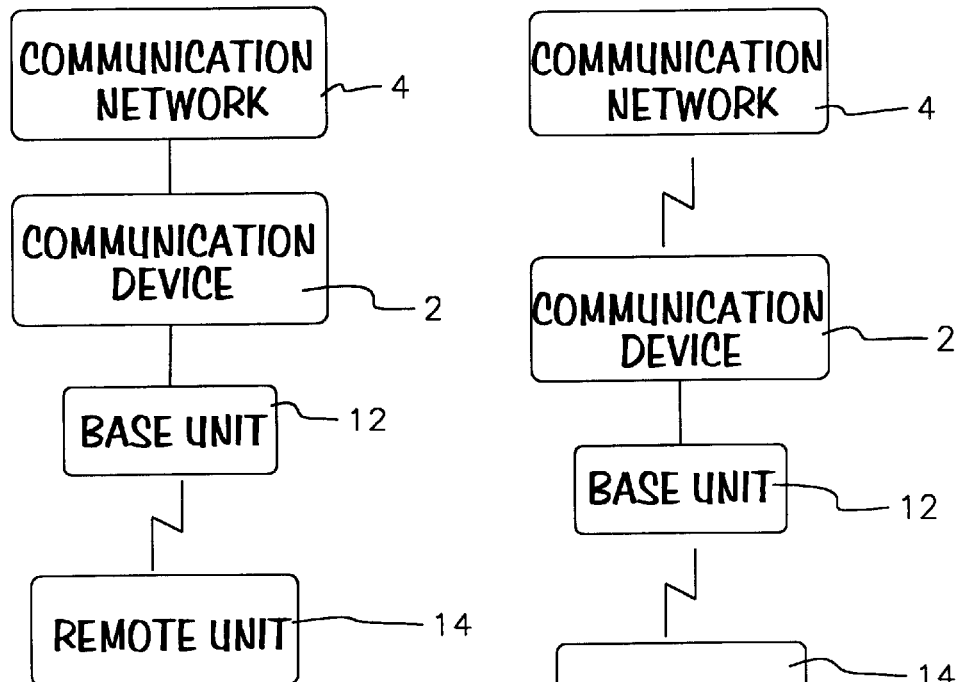
FIG. 4
FIG. 5
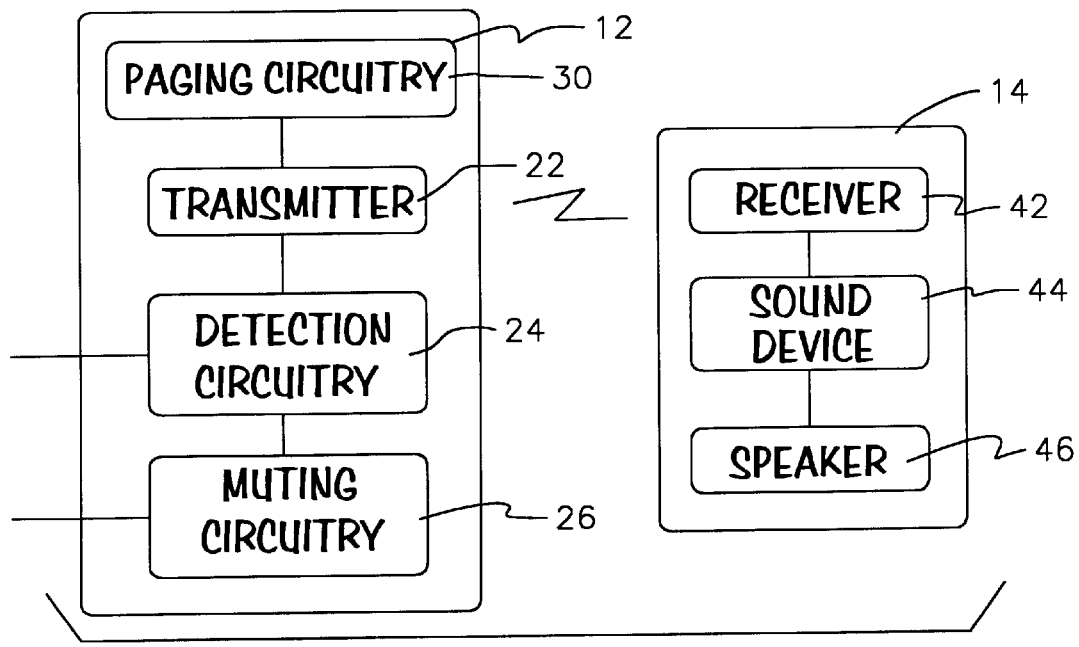
FIG. 6

REMOTE TELEPHONE CALL NOTIFICATION SYSTEM

BACKGROUND OF THE INVENTION

1. Field of the Invention

The present invention relates to call notification devices and more particularly pertains to a new remote telephone call notification system for notifying a user at a remote location that a communications device is receiving a call.

2. Description of the Prior Art

The use of call notification devices is known in the prior art. More specifically, call notification devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,404,391; 5,729,589, 5,848,362, 5,878,354, 5,894,455; and Des. 394,412

The remote telephone call notification system according to the present invention substantially departs from the conventional concepts and designs of the prior art, and in so doing provides an apparatus primarily developed for the purpose of notifying a user at a remote location that a communication device is receiving a call.

SUMMARY OF THE INVENTION

In view of the foregoing disadvantages inherent in the, known types of call notification devices now present in the prior art, the present invention provides a new remote telephone call notification system construction wherein the same can be utilized for notifying a user at a remote location that a communication device is receiving a call.

The general purpose of the present invention, which will be described subsequently in greater detail, is to provide a new remote telephone call notification system apparatus and method which has many of the advantages of the call notification devices mentioned heretofore and many novel features that result in a new, remote telephone call notification system which is not anticipated, rendered obvious, suggested, or even implied by any of the prior art call notification devices, either alone or in any combination thereof.

To attain this, the present invention generally comprises a base unit and a remote unit, with the base unit being adapted for interfacing with the communication device and the remote unit being adapted for being toted by a user. The base unit includes a transmitter for wirelessly transmitting to the remote unit, and detection circuitry for detecting reception by the communication device of an incoming ring signal. The detection circuitry causes the transmitter to transmit an activation signal upon the detection of the incoming ring signal. The remote unit comprises a receiver for receiving wireless transmissions of the activation signal from the transmitter of the base unit. The remote unit includes an audible sound device for generating an audible sound upon reception of the activation signal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new remote telephone call notification system apparatus and method which has many of the advantages of the call notification devices mentioned heretofore and many novel features that result in a new remote telephone call notification system which is not anticipated, rendered obvious, suggested, or even implied by any of the prior art call notification devices, either alone or in any combination thereof.

It is another object of the present invention to provide a new remote telephone call notification system which may be easily and efficiently manufactured and marketed.

It is a further object of the present invention to provide a new remote telephone call notification system which is of a durable and reliable construction.

An even further object of the present invention is to provide a new remote telephone call notification system which is susceptible of a low cost of manufacture with regard to both materials and labor,and which accordingly is then susceptible of low prices of sale to the consuming public, thereby making such remote telephone call notification system economically available to the buying public.

Still yet another object of the present invention is to provide a new remote telephone call notification system which, provides in the apparatuses and methods of the prior art some of the advantages thereof, while simultaneously overcoming some of the disadvantages normally associated therewith.

Still another object of the present invention is to provide a new remote telephone call notification system for notifying a user at a remote location that a communication device is receiving a call.

Yet another object of the present invention is to provide a new remote telephone call notification system which includes a base unit and a remote unit, with the base unit being adapted for, interfacing with the communication device and the remote unit being adapted for being toted by a user. The base unit includes a transmitter for wirelessly transmitting to the remote unit, and detection circuitry for detecting reception by the communication device of an incoming ring signal. The detection circuitry causes the transmitter to transmit an activation signal upon the detection of the incoming ring signal. The remote unit comprises a receiver for receiving wireless transmissions of the activation signal from the transmitter of the base unit. The remote unit includes an audible sound device for generating an audible sound upon reception of the activation signal.

Still yet another object of the present invention is to provide a new remote telephone call notification system that may be easily worn on the head of the user adjacent to the ear of the user so that notification of an incoming ring to a communication device in a manner that does not disturb others proximate to the user, and also is effective when the user is in a high noise environment.

These together with other objects, of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a diagrammatic view of elements of the present invention using a telephone communication device.

FIG. 5 is a diagrammatic view of elements of the present, invention using a cellular communication device.

FIG. 6 is a diagrammatic view of elements of the base unit and remote unit.

DESCRIPTION OF THE PREFERRED EMBODIMENT

Figure 1:
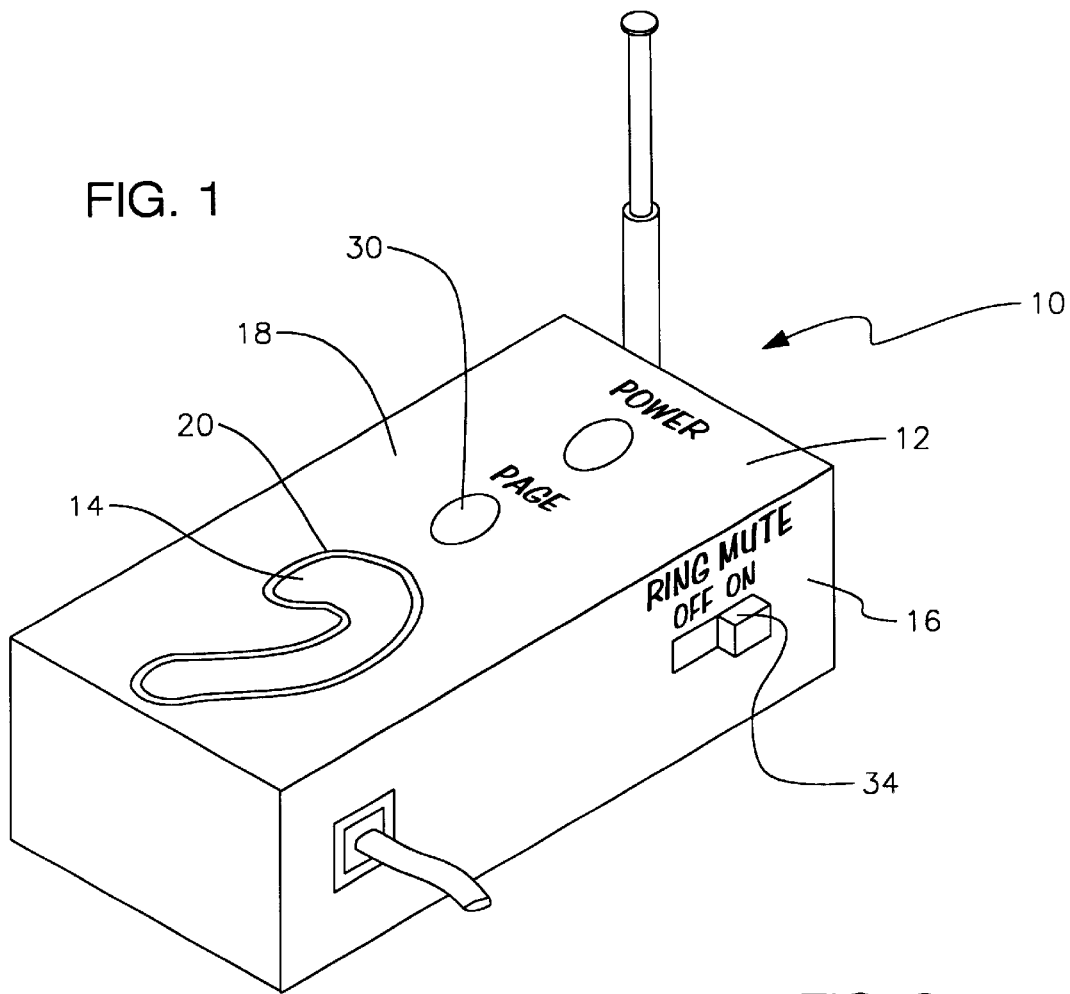
FIG. 1 is a schematic perspective view of a new remote telephone call notification system according to the present inventions and particularly illustrates one embodiment of the remote unit removably mounted on one embodiment of the base unit.

With reference now to the drawings, and in particular to FIGS. 1 through 6 thereof, a new remote telephone call notification system, embodying the principles and concepts of the present invention and generally designated by the reference numeral will be described.

As best illustrated in FIGS. 1 through 6, the remote telephone call notification system 10 for indicating that a communication device is receiving an incoming ring signal generally comprises a base unit 12 and a remote unit 14, with the base unit being adapted for interfacing with the communication device and the remote unit being adapted for being toted by a user.

The remote call notification system 10 is highly suitable for use with a communication device 2 for receiving and transmitting communication signals. The communication device may be adapted to be interfaced with a communication network 4. The communication device 2 is adapted to receive an incoming ring signal indicating that communication over the communication network 4 is desired.

The communication device 2 has an incoming ring signal notification element for notifying a user when the incoming ring signal is being received by the communication device. The incoming ring signal notification element may comprise a ringer device for producing an audible sound when the incoming ring signal is received, or may comprise a vibrator device for vibrating a portion of the communication device when the incoming ring signal is received.

The communication device may be connected to the communication network through a land line (see FIG. 4) or through a wireless connection (see FIG. 5), such as, for example, a cellular telephone or a cord less telephone.

Figure 3:
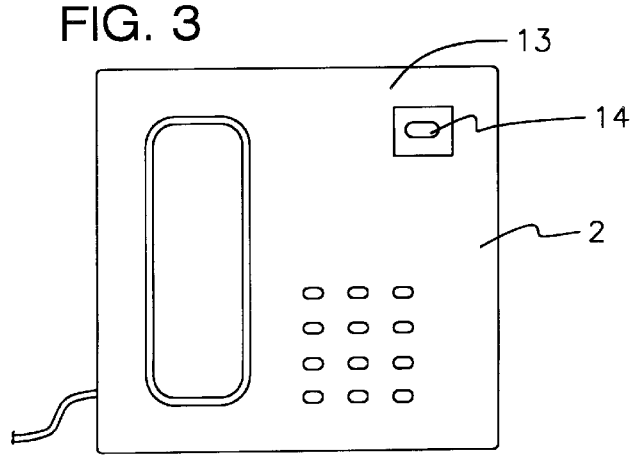
FIG. 3 is a schematic top view of an optional embodiment of the present invention particularly illustrating the integration of the base unit into a telephone communication device with the remote unit removably mounted thereon.

The remote call notification system 10 of the invention includes abase unit 12 and a remote unit 14. The base unit 12 is adapted for interfacing with the communication device. The base unit includes a base housing 16 having an interior and an outer surface 18. Optionally, as shown in FIG. 3, the base unit 13 may be integrated into the communication device. The outer surface of the base housing optionally has a storage recess 20 formed therein for removably receiving at least a portion of the remote unit 14 therein for convenient storage of the remote unit when the remote, unit is not being used.

The base unit 12 includes a transmitter 22 for wirelessly transmitting to the remote unit, and the transmitter is mounted in the interior of the housing of the base unit. The base unit further includes a detection circuit 24 for detecting reception by the communication device of an incoming ring signal. The detection circuitry may be connected to the communication device, or may be directly connected to the wiring of the communication network in a manner that detects an incoming ring signal. Upon detection of the incoming ring signal, the detection circuitry causes the transmitter to transmit an activation signal.

Optionally, a muting-circuit 26 may be provided in the base unit 12 for selectively disabling or blocking the incoming ring signal notification element of the communication device, so that the audible sound device, or generator, of the communication device, such as a bell or buzzer, temporarily does not produce a sound to notify of an incoming call.

As a further option, the base unit may include a paging apparatus 30 for paging the remote unit so that the user of the remote unit may be informed that a person at the base unit desires the attention of the user of the remote. The paging apparatus causes the transmitter -of the base unit to transmit a page signal to the remote unit. The paging apparatus may be actuated by a page switch 32 on the base unit. The page switch preferably comprises a momentary button 32 mounted on a housing of the base unit.

The base unit may also include a power switch 34 for selectively permitting power to be supplied to circuitry of the base unit, and the power switch is mounted on the base unit housing.

The remote unit 14 is adapted for being toted or carried by the user of the remote, preferably on the body of the user adjacent to the ear of the user. The remote unit has a remote housing with an interior, and, with an exterior surface 36.

Significantly, and preferably, the exterior surface of the remote housing comprises a unitary body 38 that is adapted for being substantially entirely insertable in an ear of the user. Suitably, the exterior surface of the remote housing substantially, conforms to the shape of the ear canal of the user.

Figure 2:
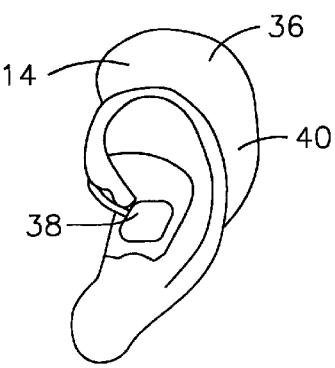
FIG. 2 is a schematic side view of a remote unit of the present invention mounted on a user's ear.

Optionally, and less preferably, the unitary body 38 of the remote unit comprises a first portion, and the remote housing includes a second portion 40 that is adapted for being worn adjacent, an ear of the user (see FIG. 2). The second portion of the remote housing may have a generally crescent shape for resting on an outer rear surface of the ear of the user, and the second portion is connected to the first portion that is at least partially insertable in the ear canal of the user.

Preferably, the remote housing is suitably adapted to block water from entering the interior of the remote housing.

The remote unit includes a receiver 42 for receiving wireless transmissions of the activation signal from the transmitter of the base unit, and the receiver is mounted in the interior of the remote housing. The receiver, and other electrical components of the remote unit, may be powered by any suitable power source, including (but not limited to) rechargeable or disposable batteries (not shown). If a rechargeable battery contained in the remote unit is employed, the rechargeable battery may optionally be recharged by the base unit 12 when the remote unit is mounted on the base unit. This may be accomplished through exposed electrical contacts on the remote unit that are adapted to contact exposed electrical contacts on the base unit when the remote unit is rested on the base unit.

The remote unit also includes an audible sound device 44 for generating an audible sound upon reception of the activation signal. The audible sound device is adapted to generate the audible sound upon receipt of the page signal. The audible sound device is mounted in the interior of the remote housing. The audible sound device may include an audio speaker 46, and optionally the audio speaker may be protected from contact with water by a thin layer of a synthetic material. The audible sound device may illustratively be adapted to create a beeping sound, or a buzzing sound. Optionally, the audible sound device may be adapted to play a prerecorded voice message for the user to hear through the speaker, which may be a more desirable announcement than the aforedescribed noises.

In use, the base unit of the invention is activated and the remote unit is mounted on the ear of the user and the user may then leave the immediate area of the communication device in which the ringer of the communication device may be heard. When the base unit detects an incoming ring signal, the base unit transmits to the remote unit a signal that causes the remote to produce an audible sound. Significantly, because of the proximity of the sound device or speaker to the ear of the user, the user is able to hear the sound in high noise areas, and the user may hear the sound without the sound being produced at a level that would disturb or alert others located proximate to the user.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A remote call notification system for indicating that a communication device is receiving an incoming ring signal, the system comprising:

a base unit and a remote unit, the base unit being adapted for interfacing with the communication device, the base unit including:

a transmitter for wirelessly transmitting to the remote unit; and detection means for detecting reception by the communication device of an incoming ring signal, the detection means causing the transmitter to transmit an activation signal upon the detection of the incoming ring signal; and the remote unit being adapted for being toted by a users, the remote unit comprising:

a receiver for receiving wireless transmissions of the activation signal from the transmitter of the base unit; and an audible sound device for generating an audible sound upon reception of the activation signal;

wherein the audible sound device plays a prerecorded voice message upon receipt of the activation signal by the remote unit;

a communication device for receiving and transmitting communication signals, the communication device being adapted to be interfaced with a communication network;

wherein the communication device is adapted to receive an incoming ring signal indicating that communication over the communication network is desired;

wherein the communication device has an incoming ring signal notification element for notifying a user when the incoming ring signal is being received by the communication device, wherein the incoming ring signal notification element comprises a ringer device for producing an audible sound when the incoming ring signal is received;

wherein the communication device is connected to a communication network by wire, wherein the communication device comprises a telephone hardwired to the network;

wherein the base unit includes:

a base housing having an interior, the base housing having an outer surface, the outer surface of the base housing having a storage recess formed therein for removably receiving at least a portion of the remote unit therein;

wherein the transmitter is mounted in the interior of the base unit;

muting means for selectively disabling the incoming ring signal notification element of the communication device;

paging means for transmitting a page signal, the paging means causing the transmitter to transmit the page signal to the remote unit, the paging means being actuated by a page switch, wherein the page switch comprises a momentary button mounted on a housing of the base unit;

a power switch for selectively permitting power to be supplied to circuitry of the base unit, the power switch being mounted on the base housing;

wherein the remote unit comprises:
  a remote housing having an interior, the remote housing having an exterior surface;
  wherein the exterior surface of the remote housing comprises a unitary body adapted for being substantially entirely insertable in an ear canal of the user;
  wherein the remote housing is adapted to block water from entering the interior of the remote housing;
wherein the receiver is mounted in the interior of the remote housing; and
wherein the audible sound device is adapted to generate the audible sound upon receipt of the page signal, the audible sound device being mounted in the interior of the remote housing, wherein the audible sound device includes an audio speaker, wherein the audio speaker is protected from contact with water by a thin layer of a synthetic material, wherein the audible sound device is adapted to play a prerecorded voice message.

* * * * *